United States Patent [19]

Dowell et al.

[11] 4,358,004

[45] Nov. 9, 1982

[54] LOAD-TAKING APPARATUS FOR A DISC PACK

[75] Inventors: Frederick S. Dowell, Coventry, England; Benedict P. Healy, Wexford, Ireland

[73] Assignee: Dunlop Limited, London, England

[21] Appl. No.: 151,807

[22] Filed: May 21, 1980

[30] Foreign Application Priority Data

May 23, 1979 [GB] United Kingdom ................. 7917928

[51] Int. Cl.³ .............................................. F16D 55/40
[52] U.S. Cl. .................................. 188/217; 188/72.4; 192/109 A
[58] Field of Search .................. 188/71.1, 72.4, 71.5, 188/71.6, 73.2, 217, 264 A, 264 AA, 264 G; 192/107 R, 107 C, 109 A, 109 B; 301/6 A, 6 E, 6 WB

[56] References Cited

U.S. PATENT DOCUMENTS

| | | | |
|---|---|---|---|
| 2,888,103 | 5/1959 | Armstrong | 188/72.4 |
| 3,498,418 | 3/1970 | Dewar | 188/72.4 |
| 3,653,472 | 4/1972 | Dowell | 188/72.4 |
| 3,887,041 | 6/1975 | Malone | 188/71.5 |
| 4,147,241 | 4/1979 | Preniczny et al. | 188/264 G |

FOREIGN PATENT DOCUMENTS

| | | |
|---|---|---|
| 1480751 | 4/1967 | France .......................... 188/264 G |
| 542578 | 1/1942 | United Kingdom . |
| 910162 | 11/1962 | United Kingdom . |
| 1347185 | 2/1974 | United Kingdom . |
| 1358668 | 7/1974 | United Kingdom . |

*Primary Examiner*—Edward R. Kazenske
*Attorney, Agent, or Firm*—Stevens, Davis, Miller & Mosher

[57] ABSTRACT

A load-taking device for use in the disc pack of a multi-disc brake assembly. The load-taking device is located at one end of the pack, interposed between the pack and a cylinder for applying thrust to the pack or for resisting thrust applied to the pack. It has an annular support and a plurality of hollow bell-shaped load-taking members extending from one side of the support in circumferentially spaced relation which are rounded at the ends which contact the adjacent disc of the pack.

5 Claims, 9 Drawing Figures

LOAD-TAKING APPARATUS FOR A DISC PACK

The present invention relates to improvements in multi-disc brakes of the kind comprising a plurality of rotor discs interleaved with a plurality of stator discs, the former being keyed to the wheel for rotation therewith and the latter being keyed to a torque tube stationary with respect to the aircraft or other vehicle to be braked. The stator and rotor discs making up the disc pack are axially slidable on their keys into mutual frictional engagement to apply the brake under the influence of thrust-applying means arranged at one end of the disc pack. Reaction means fixed to the torque tube is arranged at the other end of the disc pack to receive the thrust.

In the commonest arrangements hitherto known both the thrust-applying and the reaction means have included solid, annular plates with raised, radially spaced annular ridges presented to an adjacent disc of the disc pack. One problem encountered with this type of construction is that the plate is subject to distortion or flexing under load so that the contacted disc, which remains planar, is subjected to an unequal loading by the radially separated ridges or ribs of the plate. Other problems are the weight factor if the plate is to have sufficient rigidity to minimize the distortion problem and the damage which can be done to the relatively brittle discs by being contacted by unequally loaded annular surfaces which have only a very small extent in the radial direction of the disc.

It is among the objects of the present invention to alleviate problems of known multi-disc brake assemblies.

According to one aspect of the present invention there is provided thrust-applying or reaction means for location at one end of the disc pack of a multi-disc brake assembly to be interposed between the pack and means for applying thrust to the pack or for resisting thrust applied to the pack, said thrust or reaction means comprising an annular support and a plurality of load-taking members extending from one side of the support in circumferentially spaced relation to contact, in the assembled condition of said means, an adjacent disc of the pack at an end of each member remote from the support, each said load-taking member being secured to the support in such a way as to permit angular deflection of the member relative to the support or said adjacent disc.

According to another aspect of the present invention there is provided a multi-disc brake assembly comprising a pack of interleaved rotor and stator discs, thrust-applying means at one end of the pack and reaction means at its other end, wherein at least one of said thrust-applying end reaction means is arranged to make contact with the nearest disc of the pack, when the brake is applied, over a plurality of load-taking members interposed between said disc and said means and secured to the latter to extend circumferentially around an annular surface thereof, each said load-taking member being resiliently deformable to accommodate changes in the angular relationship of said disc and said means.

Preferably each said load-taking member is hollow and pesents to said adjacent disc, in the assembled condition, an annular load-bearing peripheral surface which is preferably of a rounded configuration.

Heat insulating material may be contained within each hollow member.

Each load-taking member is preferably generally cup-shaped, its open end being surrounded by a radially outwardly directed flange for engagement with said disc and means being provided to secure its closed end to said annular surface. This securement means may comprise a rivet penetrating said closed end coaxially, or a projection from the closed end seated in a recess therefor in the annular member and trapped therein by a slotted ring secured to said annular surface.

To give each load-taking member freedom for angular movement relative to the support, to accommodate temporary or permanent distortions which render the support surface and the adjacent disc non-parallel, the contour of the closed end of the "cup" presented to the annular surface may be slightly rounded, or if the securement of the "cup" to the support is by means of a projection seated in a recess this may resemble a ball-and-socket universal joint. To avoid excessive angular deflection of the load-bearing members under gravity when they are not in contact with a disc, such mis-alignment being a potential danger of damage to the disc when the load-bearing members are subsequently pressed against it, they may be jointly held by a flexible ring fixed between said members to said annular surface, the ring holding said members normally in attitudes perpendicular to the plane of the annular surface, the ring yielding to forces generated when a support is pressed against a non-parallel disc but returning the load-bearing members to their perpendicular alignment when braking pressure is relieved.

The thrust-applying means may comprise a plurality of thrust-applying devices located behind and in circumferentially spaced relation around the annular support, and in this arrangement two of the load-taking members are preferably arranged on opposite sides of each thrust-applying device, the number of said load-taking members on the annular support being twice the number of thrust-applying devices arranged behind the support.

Preferred embodiments of the invention will now be described with reference to the accompanying drawings, in which:-

Figure 5:
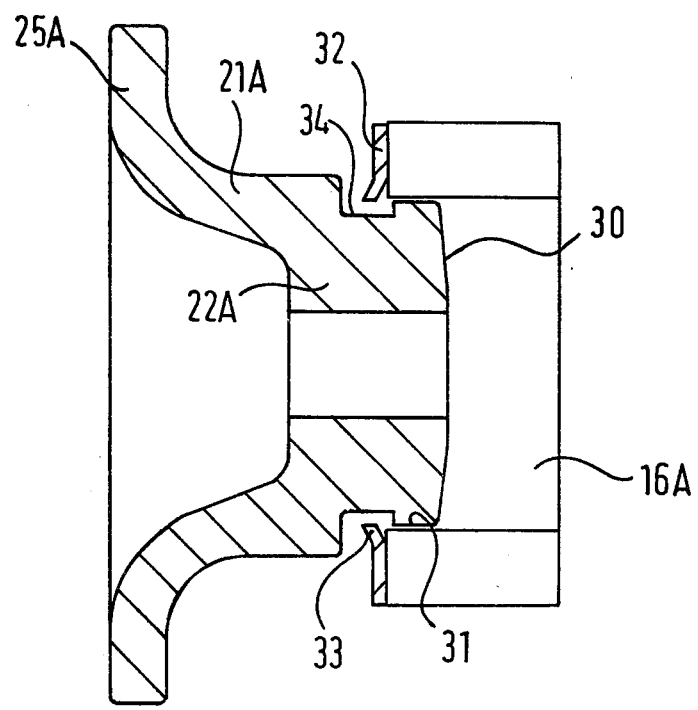
FIG. 5 is a detail view resembling the righthand side of FIG. 1 showing a modified load-taking member and means for securing the same to an annular reaction flange.
Figure 6:
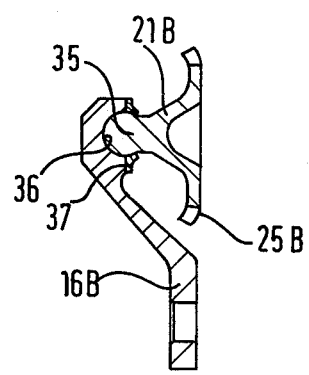
Figure 7:
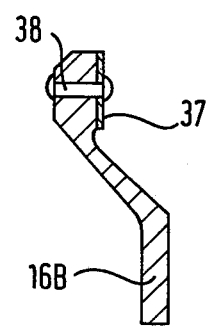
Figure 8:
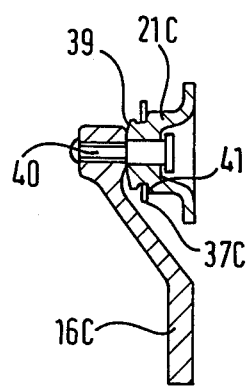
Figure 9:
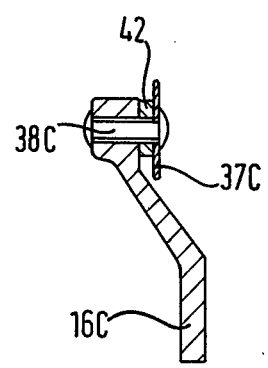

FIGS. 6 and 7 are views similar to FIG. 5 of a modified assembly, being radial sectional views of a reaction flange taken at circumferentially spaced positions around it, and FIGS. 8 and 9 are views respectively resembling FIGS. 6 and 7 of a further modified assembly.

Figure 1:
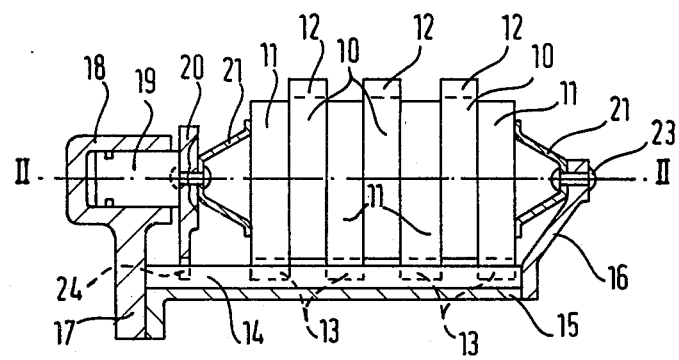
FIG. 1 is a view in radial section of a multi-disc brake assembly in accordance with the invention, the view being taken on the line I—I of FIG. 2.
Figure 2:
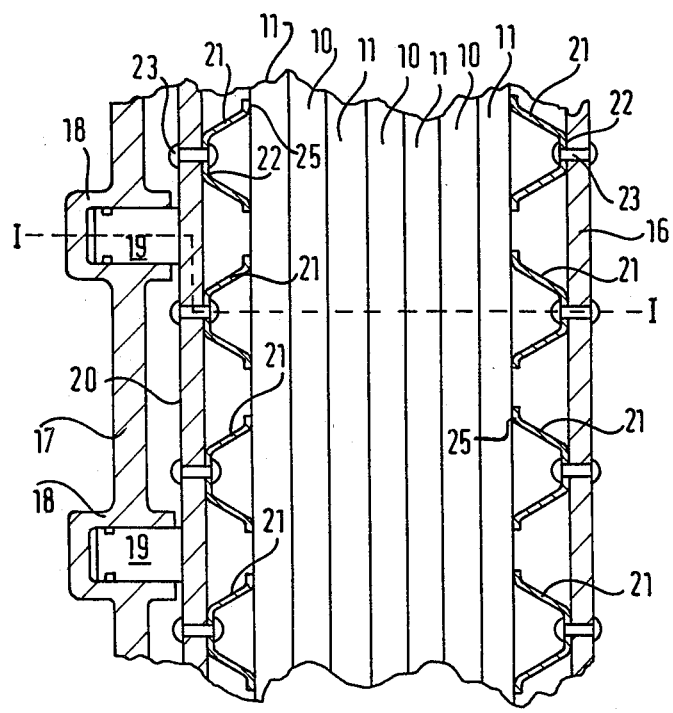
FIG. 2 is a developed circumferential section of the assembly of FIG. 1 taken in an arc concentric with the axis X—X of the assembly and indicated at II—II in FIG. 1.

FIGS. 1 and 2 illustrate a multi-disc brake assembly comprising a disc pack consisting of three rotor discs 10 interleaved with four stator discs 11. Each of the discs 10 and 11 is a solid annulus of carbonaceous material, the rotors 10 being keyed at 12 at their outer peripheries to an aircraft landing wheel (not shown) and the stators 11 being keyed at their inner peripheries at 13 to dogs, such as 14, projecting in circumferentially spaced relation from a torque tube 15 fixed to the stationary axle structure (not shown) of the wheel. Fixed to one end of the torque tube 15 is an annular reaction member 16 and fixed to the other end of the torque tube 15 is an annular support member 17 having integral therewith circumferentially separated cylinders 18 in which respective hydraulic pistons 19 are reciprocable under the influence of hydraulic fluid pressure introduced into the cylinders 18. All of the pistons 19 bear on an annular support plate 20 which is keyed as at 24 to the torque tube 15 so as to be axially displaceable theralong.

In accordance with the present invention, there are interposed between the radially outer end of the reaction member 18 and the adjacent stator 11 of the disc pack a plurality of frusto-conical load-taking members 21 arranged in circumferentially spaced relation around the reaction member 16 and each secured thereto at its frustum surface 22 by means of a rivet 23. Also in accordance with the invention, similar load-taking members 21 are interposed between the support 20 and the adjacent stator 11 of the disc pack, frusto-conical load-taking members 21 being arranged in circumferentially spaced relation around the support 20 and being secured thereto by rivets 23 penetrating the frustum ends 22 of the members 21. Each of the load-taking members 21 contacts the adjacent stator disc 11 over a radially outwardly directed flange 25 surrounding the open end of the member 21.

Each of the load-taking members 21 is a lightweight metal and in the illustrated embodiments each is of circular section contacting the disc pack over a flange 25 which forms a full circle. However the shape of each hollow load-taking member 21 could be such that its flange 25 forms a closed figure other than a circle, such as an ellipse or a rectangle.

Any desired configuration may be adopted for the load-taking members 21 such that the flanges 25 contacting the disc pack extend both radially and circumferentially of the contacted disc.

Figures 3, 4:
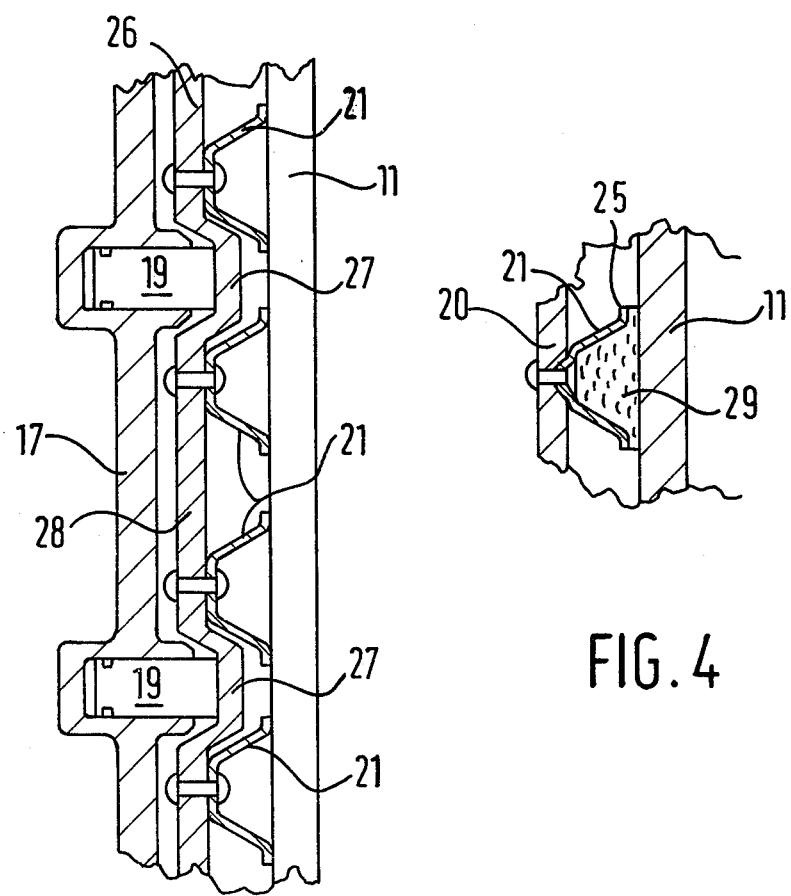
FIG. 3 is a view similar to FIG. 2 of a modified thrust-applying means.
FIG. 4 illustrates a further modification of the invention in a view similar to FIG. 3.

In the embodiment of the invention illustrated in FIG. 3 the flat thrust plate 20 of FIGS. 1 and 2 is replaced by a thrust plate 26 which has indentations 27 accommodating the respective piston 19. This has the advantage that the portions 28 of the plate 26 between the indentations 27 which carry the members 21 are set back toward the support 17 which permits shortening of the overall axial length of the assembly.

It will be noted that both in the embodiments of FIGS. 1 and 2 and that of FIG. 3 the number of load-taking members 21 is twice that of the pistons 19, each piston 19 having a member 21 equally spaced on each side of it. By this arrangement, axial deflection of the pressure plate 20 or 26 at the locations of the members 21 will be equal at each member 21 which will ensure that each member 21 will be equally loaded against the adjacent stator disc 11.

As illustrated in FIG. 4, each hollow member 21 may be filled with a body of heat insulating material 29 which extends axially outwardly from the open end of the member 21 into contact with the adjacent stator 11. The inclusion of heat insulating material in each member 21 will have the effect of reducing heat transfer from the disc pack to the thrust-applying assembly and thence to the internal end of the wheel assembly. The body 29 may be rigid but is not necessarily of high strength as it is contained within the hollow member 21. It may be bonded into the member 21 or alternatively it may be of a crushable heat insulating material in which case the flange 25 shown in FIG. 4 would be omitted.

In the modification of the invention shown in FIG. 5 the cup-shaped load-taking member 21A is of a more robust (i.e. less flexible) construction, but instead of contact between the closed end 22A of the member and the reaction ring 16A being over flat surfaces the outer surface 30 of the closed end of the member is of a bowed or domed configuration and it is seated in a correspondingly shaped cavity 31 in the reaction ring 31. The load-taking member 21A is loosely retained in the cavity 31 by a retaining ring 32 which is rivetted or otherwise secured to the reaction member 16A and has an aperture surrounded by an outwardly flared flange 33 which is engaged in a peripheral groove 34 in the base of the member 21A. This arrangement permits limited angular movement of the member 21A relative to the reaction member 16A to accommodate any non-parallelism which may arise, in use, between the plane of the member 16A and the plane of the brake disc contacted by the flange 25A of the member 21A.

The arrangement of FIGS. 6 and 7 similarly provides for angular movement of each load-taking member 21B relative to the annular reaction member 16B by means of a ball-and-socket universal joint, the ball 35 being formed as an integral projection from the frustum of the conical member 21B and being located in a socket 36 in the member 16B. To hold the ball 35 in the socket 36 an apertured ring 37 extends circumferentially around the face of the reaction member 16B presented toward the disc pack and is held tightly thereto by rivets 38 interposed around the ring 37 between the members 21B. It will be seen that the ring 37, which is preferably of spring metal, bears on the ball 35 to provide frictional resistance to displacement of the member 21B from its intended, perpendicular relation to the plane of the annular support 16B, for example under gravity, but this resistance will be overcome if the member 21B is pressed against a disc to which the member 16B is non-parallel.

Furthermore, to reduce damage to a brake disc which might otherwise result from pressing against it a member 21B which has previously been angularly deflected the flange 25B at the open end of the member 21B is outwardly and rearwardly flared, so that initial contact with a disc by a sharp edge of the flange will be avoided.

In the further modification of the invention shown in FIGS. 8 and 9 the load-taking members 21C resemble that of FIG. 5, having a slightly dished closed end 39 abutting a slightly rounded face of the annular reaction member 16C, facilitating a degree of angular deflection permitted by the tolerances of the stepped rivet 40 in the associated bores in the member 21C and the member 16C. To hold all the load-taking members 21C perpendicular to the member 16C except when under deforming loads a ring 37C joins them at a position spaced from the reaction member 16C. A reduced-diameter portion 41 of each member 21C provides a shoulder abutting a respective aperture in the ring 37C, which is held in spaced relation to the member 16C by rivets 38C on which spacer washers 42 are located. The ring 37C is of spring metal so that it can locally deform to allow angular deflection of one or more of the load-taking members 21C but will tend to restore these to perpendicular relation with the reaction member 16C when the deforming force is relieved.

Among the advantages of an assembly in accordance with the invention are possible weight saving, better distribution of pressure on the end discs of the heat pack since there is radial as well as circumferential distribution of the load and the possibility of loading the stator disc nearest the thrust-applying devices at twice as many locations as there are pistons 19, each load-taking member being of larger diameter than the associated piston.

Having now described our invention what we claim is:

1. In a brake assembly having a multi-disc pack and means for applying thrust to the pack and resisting thrust applied thereto, the improvement comprising load-taking means for location at one end of the disc pack to be interposed between the pack and said thrust means said load-taking means comprising an annular support and a plurality of separate hollow, bell-shaped load-taking members each being individually deformable and each having an annular open end and a closed end, said members extending from one side of the support and in circumferentially spaced relation to each other, each member having a rounded annular peripheral surface at its open end to contact an adjacent disc of the pack, means being provided to secure the closed end of each load-taking member to the support in such a way as to permit limited angular deflection of the member relative to one of said support and said adjacent disc.

2. The assembly claimed in claim 1, wherein said securement means comprises a projection from the closed end seated in a recess therefor in the annular support and trapped therein by a slotted ring secured to said annular support.

3. The assembly claimed in claim 2, wherein the contour of the closed end of the bell presented to the annular support is slightly rounded to permit limited angular deflection of the bell about its closed end.

4. The assembly claimed in claim 2, wherein said securement means comprises a flexible ring fixed between said load-taking members to said annular support, the ring holding said members normally in attitudes perpendicular to the plane of the annular support, the ring yielding to forces generated when a load-taking member is pressed against a non-parallel disc but returning the load-taking members to a perpendicular alignment to the support when braking pressure is relieved.

5. The assembly claimed in claim 1, wherein the thrust-applying means comprises a plurality of thrust-applying devices located behind and in circumferentially spaced relation around the annular support, and two of the load-taking members are arranged on opposite sides of each thrust-applying device, the number of said load-taking members on the annular support being twice the number of thrust-applying devices arranged behind the support.

* * * * *